United States Patent [19]

Marsh, Jr.

[11] 4,053,247
[45] Oct. 11, 1977

[54] DOUBLE SLEEVE PIPE COUPLER

[76] Inventor: Richard O. Marsh, Jr., 1101 Standard Life Bldg., Pittsburgh, Pa. 15219

[21] Appl. No.: 710,571

[22] Filed: Aug. 2, 1976

Related U.S. Application Data

[63] Continuation-in-part of Ser. No. 598,624, July 24, 1975, which is a continuation of Ser. No. 453,501, March 21, 1974, abandoned.

[51] Int. Cl.² ............................................. B25G 3/28
[52] U.S. Cl. ................................... 403/279; 403/285; 285/177; 285/382.4; 285/398; 29/506; 61/53; 403/282
[58] Field of Search ............... 403/279, 280, 282, 285, 403/301, 305, 361; 285/177, 382.4, 398, 332.1; 29/523, 506, 512, 522; 61/53

Primary Examiner—Wayne L. Shedd
Attorney, Agent, or Firm—Beull, Blenko & Ziesenheim

[57] ABSTRACT

The specification discloses a double sleeve coupler for coupling coaxially juxtaposed plain end steel pipe sections or pipe pile in metal-to-metal leakproof contact and at the same time providing a high strength connection under tension. A number of forms of couplers are disclosed, all essentially having two rigid metallic cylindrical sleeves of different diameter arranged coaxially one within the other with an annular space or socket therebetween at each end into which the wall of the plain end pipe or pipe pile may be driven as by hammering or by a pile driving hammer. The annular space between the sleeves expands radially outwardly in diameter toward the center of the coupler to a larger cylindrical diameter adjacent the center of the coupler. The length of the expanded inner section of the socket exceeds the thickness of the annular space forming the socket. Thus, as the pipe or pipe pile is hammered or driven into the coupler, the wall of the pipe or pipe pile is expanded over the inner sleeve to a larger diameter section of substantial length to form a metal-to-metal seal therewith. The expanded diameter section of the pipe or pipe pile reacts with the outer sleeve to restrain the separating movement of the pipe or pipe pile sections from the coupler when placed under tension. In the case of pipe pile, a central wall separating the annular spaces at opposite ends of the coupler provides a drive ring via which one section of expanded pipe pile may coaxially drive another section of pipe pile.

22 Claims, 18 Drawing Figures

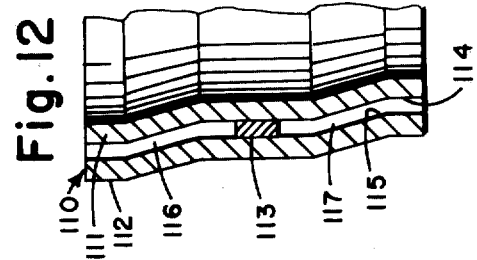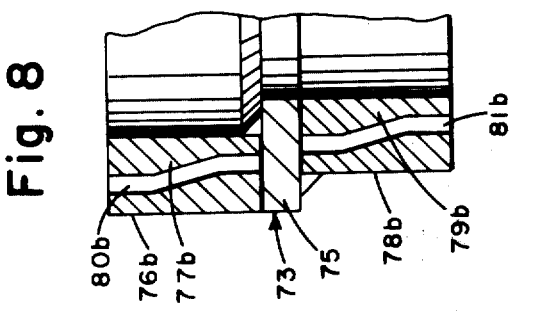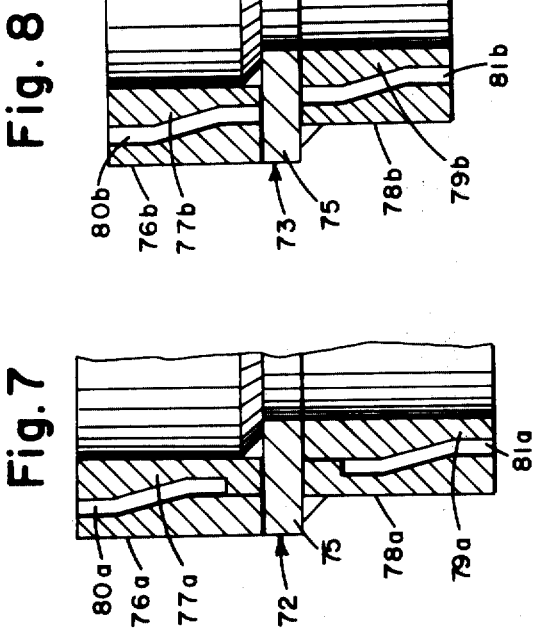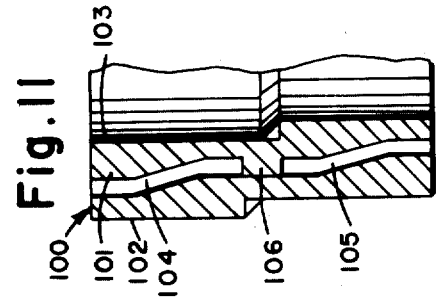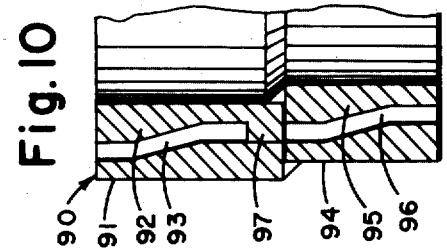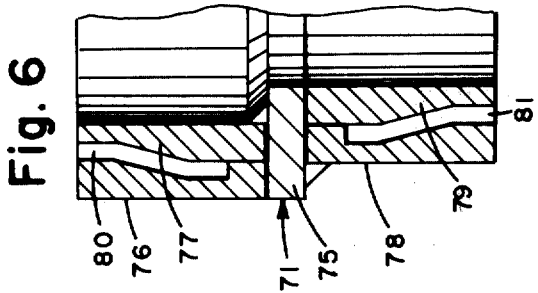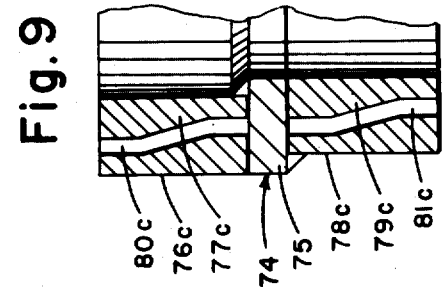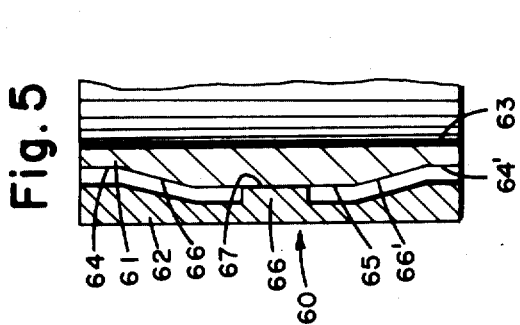

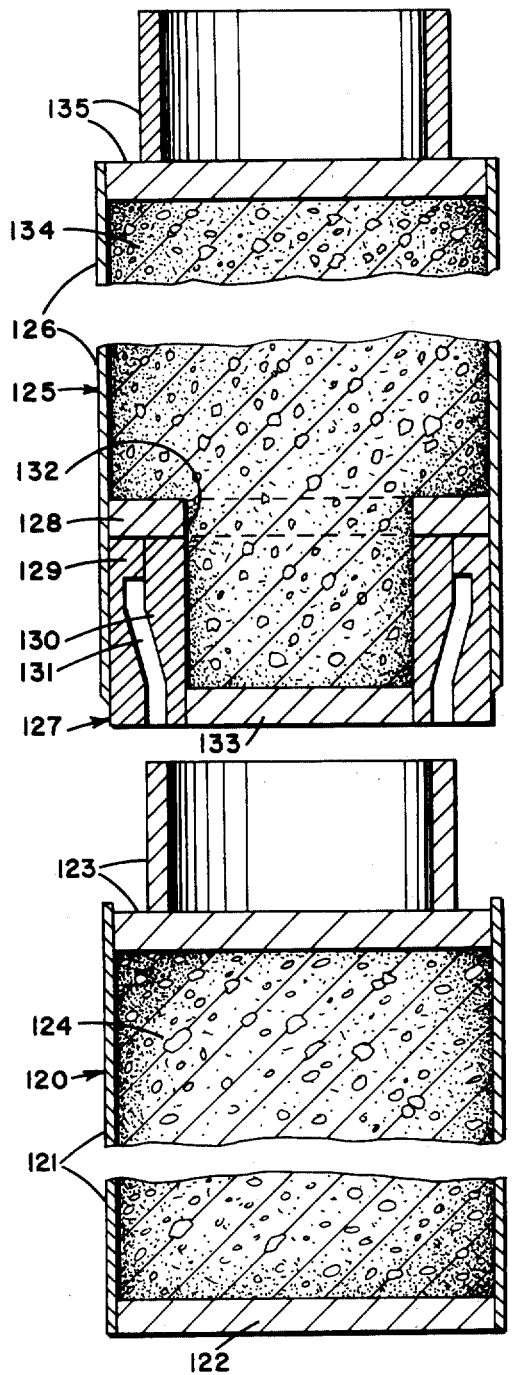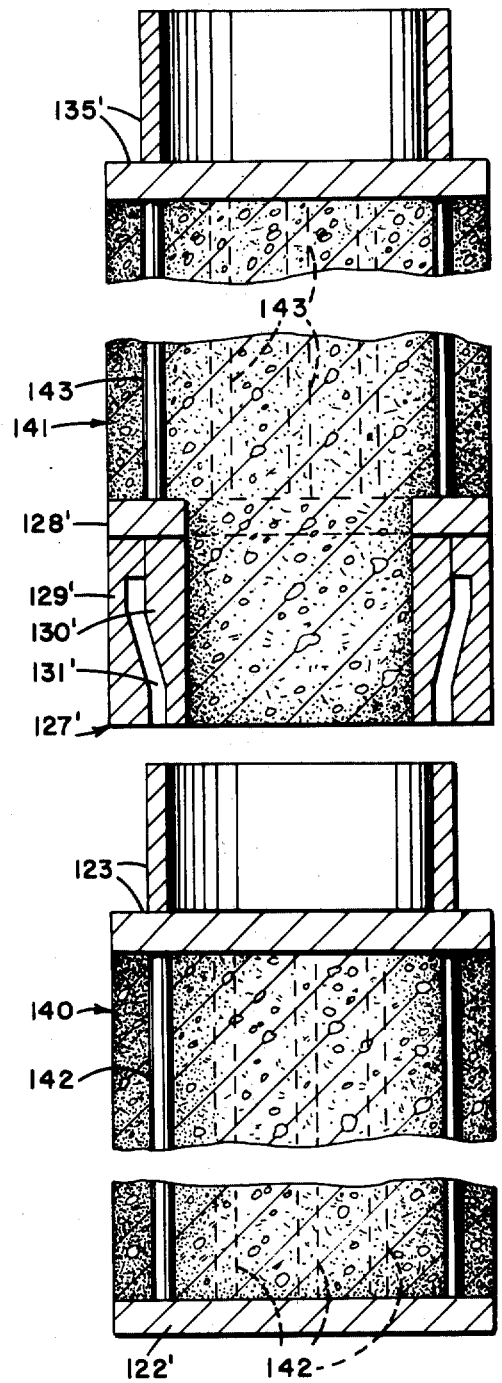

Fig. 15
Fig. 16
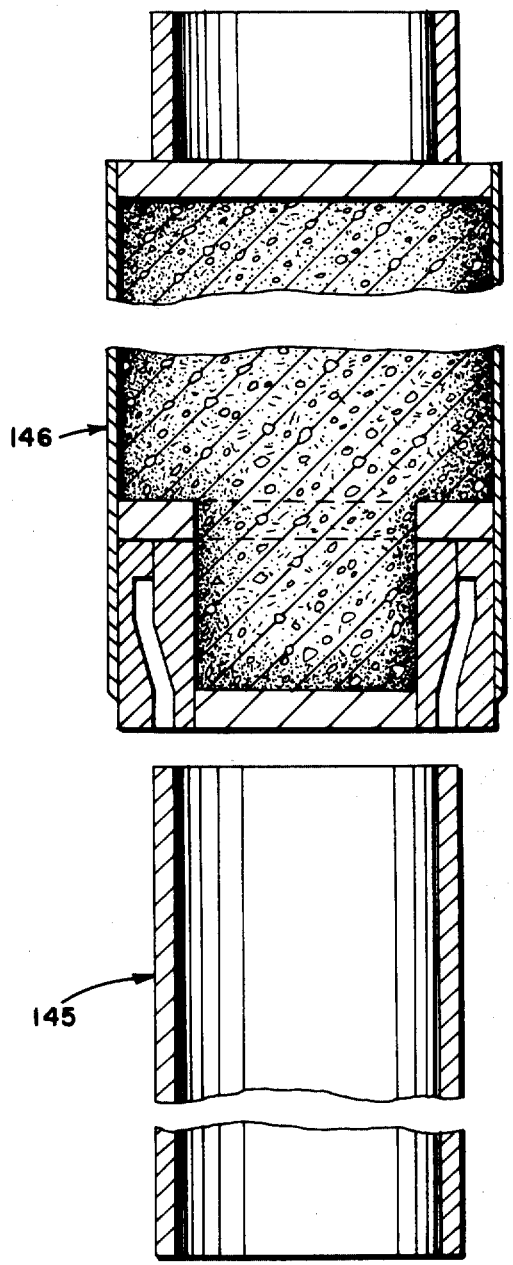
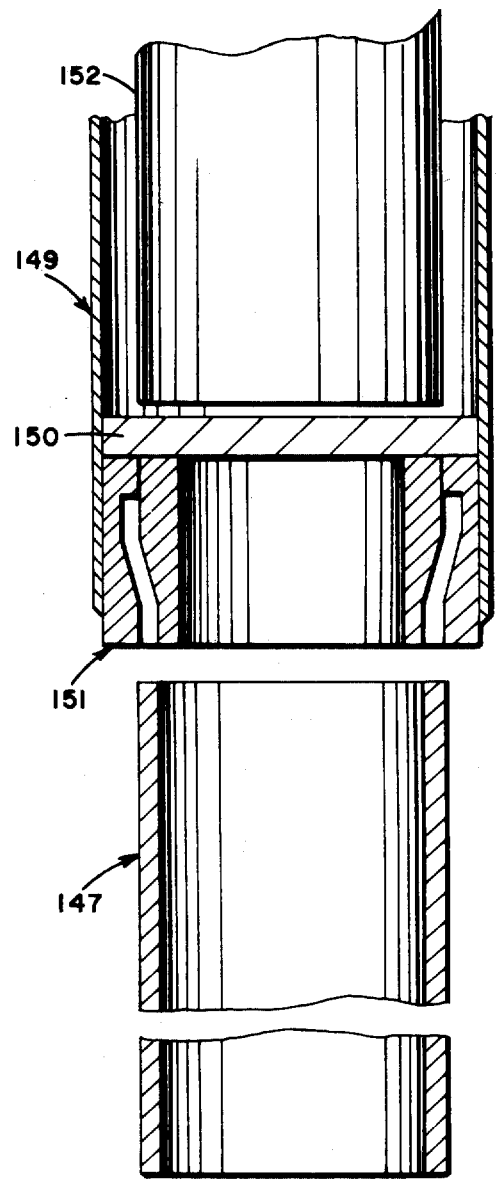

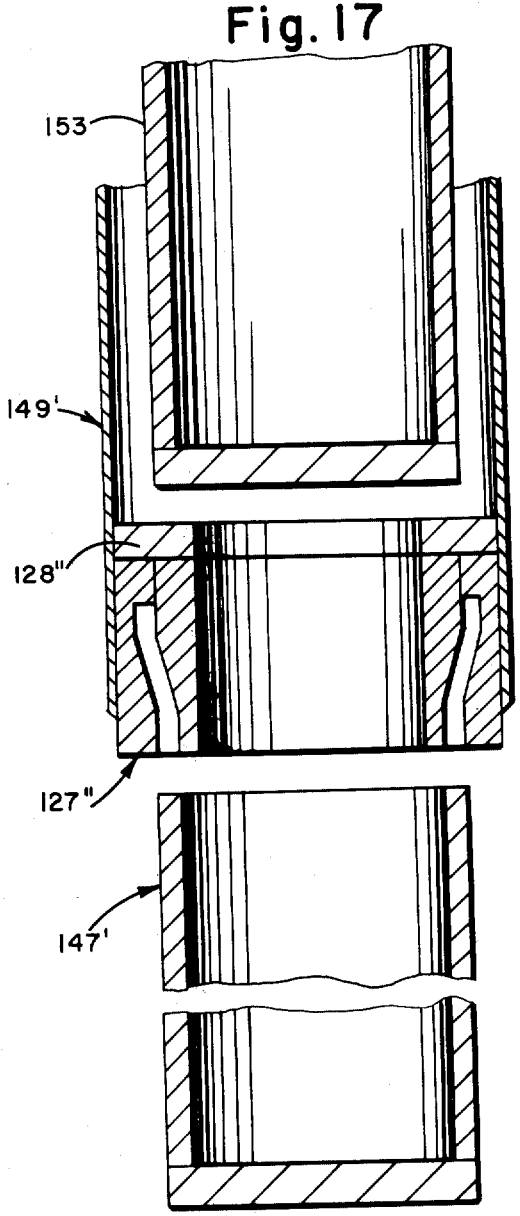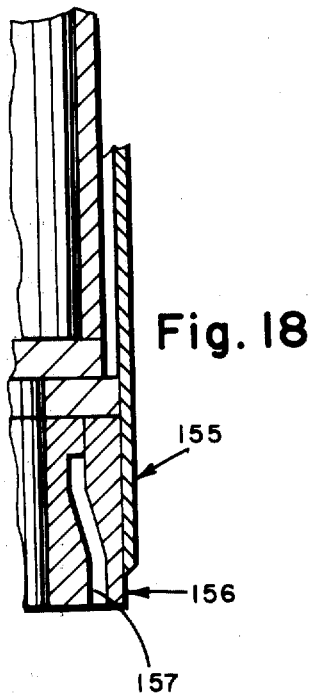

DOUBLE SLEEVE PIPE COUPLER

This application is a continuation-in-part of my prior application Ser. No. 598,624 filed 7/24/75 which, in turn, is a continuation of my prior application Ser. No. 453,501, filed Mar. 21, 1974, and now abandoned.

This invention is a rigid metallic double sleeve type coupler for pipe, open-ended pipe pile, and pre-cast concrete pile which is installed with a high energy driving force such as that of a pile driving hammer. The expansion or contraction of the wall of the pipe pile incidental to installation of the coupler produces a metal-to-metal leakproof seal and a connection of high strength under tension between successive sections of pipe, pipe pile, and pre-cast concrete pile.

In the installation of pipe lines of large diameter pipe utilized for long distance transmission of gases and liquids, the sections of pipe are connected together by welding or by the use of sleeve type couplers having gaskets which make sealing contact with the exterior of the pipe. The welding of pipe of large diameter requires specialized welding equipment and trained personnel in order to insure a satisfactory, durable and leakproof joint. The welding operation is frequently difficult under field conditions due to the terrian through which the pipe line is being laid. Moreover, the welding operation is costly and time consuming. The gasket type couplers are not as durable or permanent as might be desired because of deterioration of the gaskets. Moreover, the gasket type couplers do not, so far as is known, provide satisfactory tensile strength.

Also, in pile driving operations utilizing hollow or pipe pile, it is often necessary to splice a second section of pipe pile to one already driven in the ground in order to reach a sound bering on bed rock. Such splicing is accomplished either by a welding operation or by the use of conventional drive sleeves. Welding of pipe pile in the field provides a satisfactory splice but is costly and time consuming because during the welding operation, some of the pile driving crew as well as the equipment are idle. The present known drive sleeves, such as that in prior U.S. Pat. No. 3,326,006, provide little or no tensile strength and they, therefore, cannot be used where tension or bending stresses are present in the piles. Thus in many cases, the known drive sleeves cannot be employed.

In my prior U.S. Pat. No. 3,762,173 issued Oct. 2, 1973, there is disclosed a drive sleeve for pipe pile which has certain advantages but which does not provide a leakproof or sealed connection. In my prior co-pending application Ser. No. 421,736 filed Dec. 4, 1973, there is disclosed a sleeve type coupler for pipe pile which provides a leakproof seal, thereby preventing seepage of water into a driven pile. Seepage of water into a driven pile is objectionable in that it causes rust to develop inside the pile and in that an accumulation of water inside the pile interferes with a satisfactory filling of the pile with aggregates or cement.

It is the purpose of my present invention to provide an improved type of sleeve coupler for pipe, open-end pipe pile, and pre-cast concrete pile which not only insures a leakproof seal but which also is capable of sustaining high tensile forces.

More particularly, I provide a number of various forms of coupler for pipe, open-end pipe pile, and pre-cast concrete pile, of the double or concentric sleeve type wherein the annular space between the two sleeves provides a socket which expands toward the center of the coupler from a smaller to a larger diameter cylindrical section. The expansion of the pipe or pipe pile over the inner sleeve to an expanded cylindrical portion as the pipe is driven home provides a metal-to-metal seal while separation of pipe, pipe pile or pre-cast pile from the coupler due to the tension therebetween is resisted by the reaction against the outer sleeve.

I further provide a number of different forms of double sleeve type of coupler as above described, in which the length of the inner expanded cylindrical portion of the annular socket substantially exceeds the thickness of the socket, thereby providing the means for resisting separation of pipe or pipe pile sections from the coupler under tension.

I further provide various forms of pipe pile, and pre-cast concrete pile embodying therein couplers of the double sleeve type.

I further provide a number of variations of double sleeve coupler of the type heretofore described wherein a central ring or wall is interposed between two longitudinally spaced annular sockets to serve as a drive ring whereby one pipe pile section may drive another.

I further provide a method and means for making and for installing the double sleeve type couplers previously described.

Further and more explicit details of the double sleeve type of coupler, as a separate unit or in combination with pipe pile and pre-cast concrete pile, as well as a method and means of making and of installation of the couplers will be described hereinafter in connection with the accompanying drawings, wherein.

FIG. 5 is a fragmental sectional view of a variation of the form of coupler shown in FIG. 2, FIGS. 6 to 9 are fragmental sectional views, respectively, of four other modified forms of couplers for coupling plain end pipe and pipe pile sections of different diameters. In FIG. 6, the sockets at both ends of the coupler cause expansion of the pipe or pipe pile diameter to a larger diameter. In FIGS. 7 to 9, the sockets at opposite ends of the coupler differ in that one socket causes circumferential expansion of the pipe or pipe pile driven thereinto whereas the other socket causes circumferential contraction of the pipe or pipe pile driven thereinto;

FIGS. 10 to 12 are fragmental sectional views, respectively, of three other modified forms of couplers for joining pipe or pipe pile sections of different diameters;

FIG. 13 is a vertical sectional view, showing pre-cast concrete pile sections with outer metal shell embodying a form of coupler similar to that of FIG. 6;

FIG. 14 is a vertical sectional view, showing pre-case concrete pile sections (without outer shell) embodying a form of coupler similar to that of FIG. 6;

FIG. 15 is a vertical sectional view, showing a composite of pre-cast concrete pile with outer shell and an open-end pipe pile, the former embodying a coupler similar to that of FIG. 6;

FIG. 16 is a vertical sectional view, showing a composite of an open-end pipe pile and an upper section of mandrel driven thin-wall pipe pile of somewhat larger diameter closed at its lower end and embodying a coupler of the type shown in FIG. 6;

FIG. 17 is a vertical sectional view, showing a composite of pipe pile sections similar to that of FIG. 16 and embodying a coupler of the type shown in FIG. 6, the upper section of thin-wall pipe pile being open at its lower end; and FIG. 18 is a fragmental vertical sectional view, showing a variation of the pipe pile sections of FIG. 17, in which the socket in the coupler embodied in the upper pile section causes circumferential contraction of the lower section of pipe pile as it is driven upwardly into the coupler as distinguished from circumferential expansion of the lower section of pipe pile characteristic of the coupler in FIG. 17.

Figure 1:
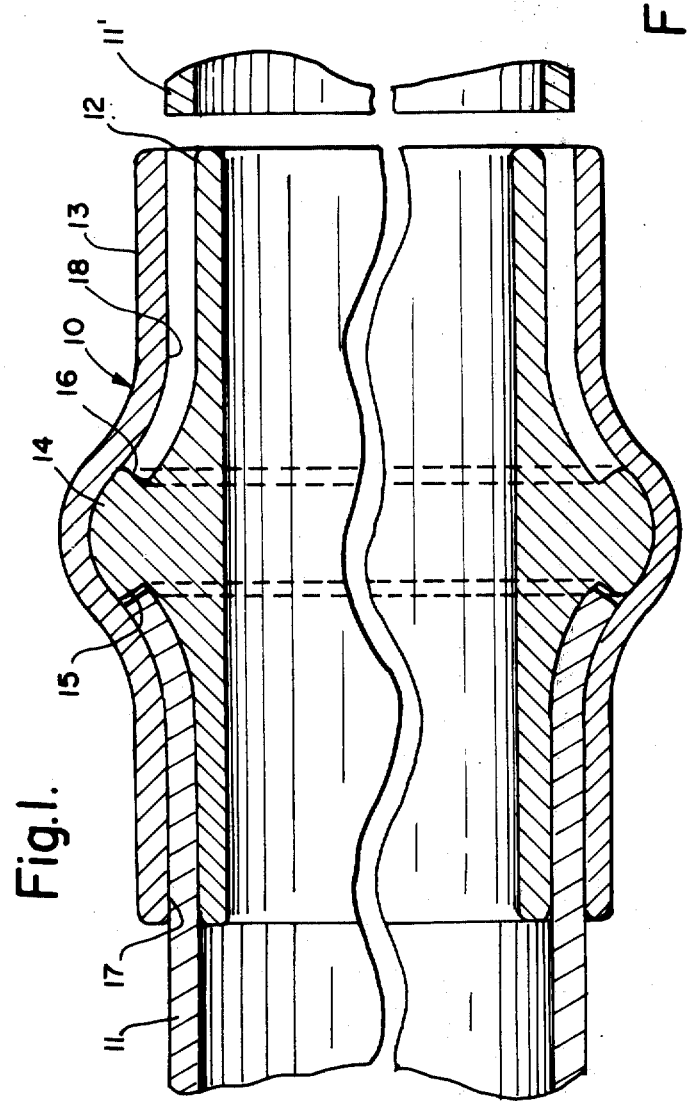
FIG. 1 is a longitudinal cross-sectional view of one embodiment of double sleeve coupler for pipe or pipe pile, showing one pipe section as driven into the coupler and one pipe section prior to being driven into the coupler.

Referring to the drawings, there is shown in FIG. 1 an embodiment of a pipe coupler 10 for coupling two coaxially juxtaposed sections of plain end pipe 11 and 11' of uniform diameter. Coupler 10 comprises an inner sleeve element 12 and an outer sleeve element 13, of rigid metallic nature, such as steel, arranged coaxially and concentrically. Inner sleeve element 12 is formed with a central annular projection 14 having a curved exterior outline and two shoulders 15 and 16 on opposite sides thereof. The outer sleeve element 13 is suitably formed, as by forging or pressing over the inner sleeve, in a manner that annular spaces 17 and 18 are formed at opposite ends of the coupling. The spaces 17 and 18 are of uniform thickness slightly larger than the thickness of the wall of the pipe 11 and 11' and flare outwardly toward projection 14 so as to terminate at the shoulders 15 and 16 respectively.

Figure 4:
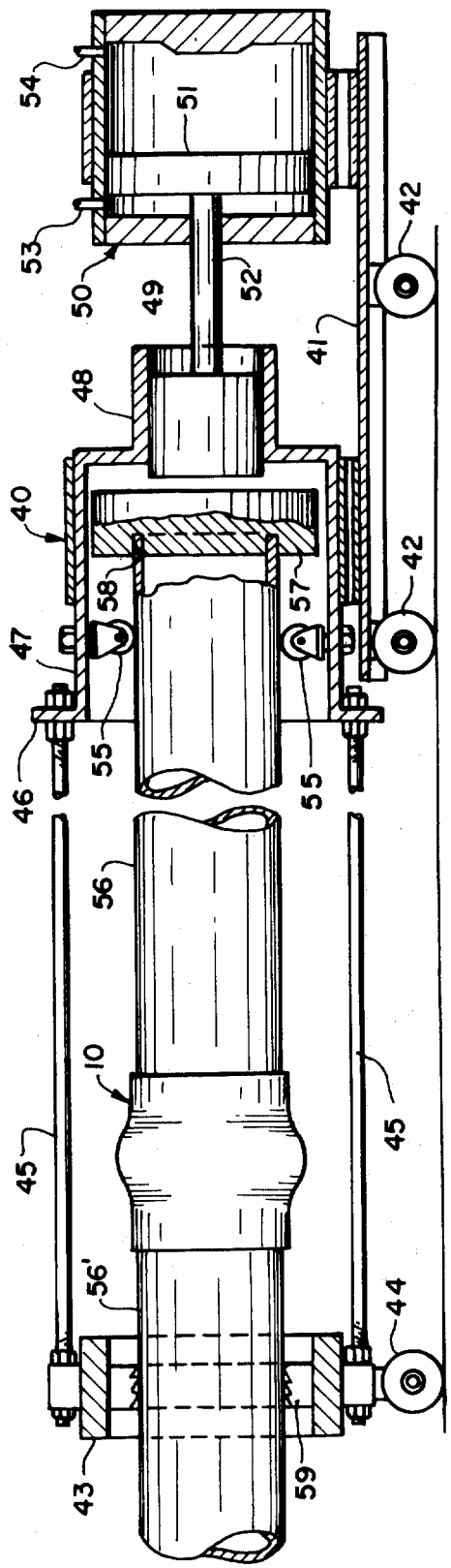
FIG. 4 is an elevational view of a mobile ram or hammer device for applying high energy driving forces to install double sleeve couplers.

The inner and outer sleeves elements 12 and 13 are of a thickness and rigidity such that when the pipe sections are driven telescopically into the annular spaces 17 and 18 the end portion of the pipes is expanded, in correspondence with the outwardly flared inner end portion of the annular space. Due to the degree of expansion thus effected, the metal in the pipes is stretched beyond the elastic limit and also beyond the yield point of the metal. The shoulders 15 and 16 on the central projection swerve to stop the inward movement of the pipe sections. In FIG. 1, the pipe section 11 is shown in the position and form it assumes when driven home in the annular space 17 into contact with the stop shoulder 15. Apparatus suitable for installing the coupler 10 on the pipe sections 11 and 11' is shown in FIG. 4 and will be described later.

In consequence of the expansion of the end of pipe section 11 over the inner sleeve element 12, a metal-to-metal seal is provided between the pipe section and the outer surface of the inner sleeve element 12. Conversely, in view of the flaring of the end of the pipe section 11 within the coupling, the outer sleeve element 13 restraints the separation of the pipe sections when placed under tensile stresses. Under service conditions, it is unlikely that the stresses tending to separate the pipe sections would equal or exceed the forces required to install the coupling, since in order to separate the pipe sections from the coupler a pull equal to the installation driving force would be required. Such a pulling force would far exceed that for which the pipe line is designed. Stated differently, on installation the metal pipe is stressed beyond the yield point of the metal but, under service conditions, the stresses on the metal pipe would be well below the yield point of the metal.

It will be observed that if the driving force on the pipe section is continued after the end of the pipe contacts either of the shoulders 15 or 16, such hammering force will tend to upset the end of the pipe and thus forge an even tighter and stronger connection with the coupler.

Coupler 10 is intended for a relatively permanent or a long-term type of installation and not for repeated or frequent installation and removal.

Figure 2:
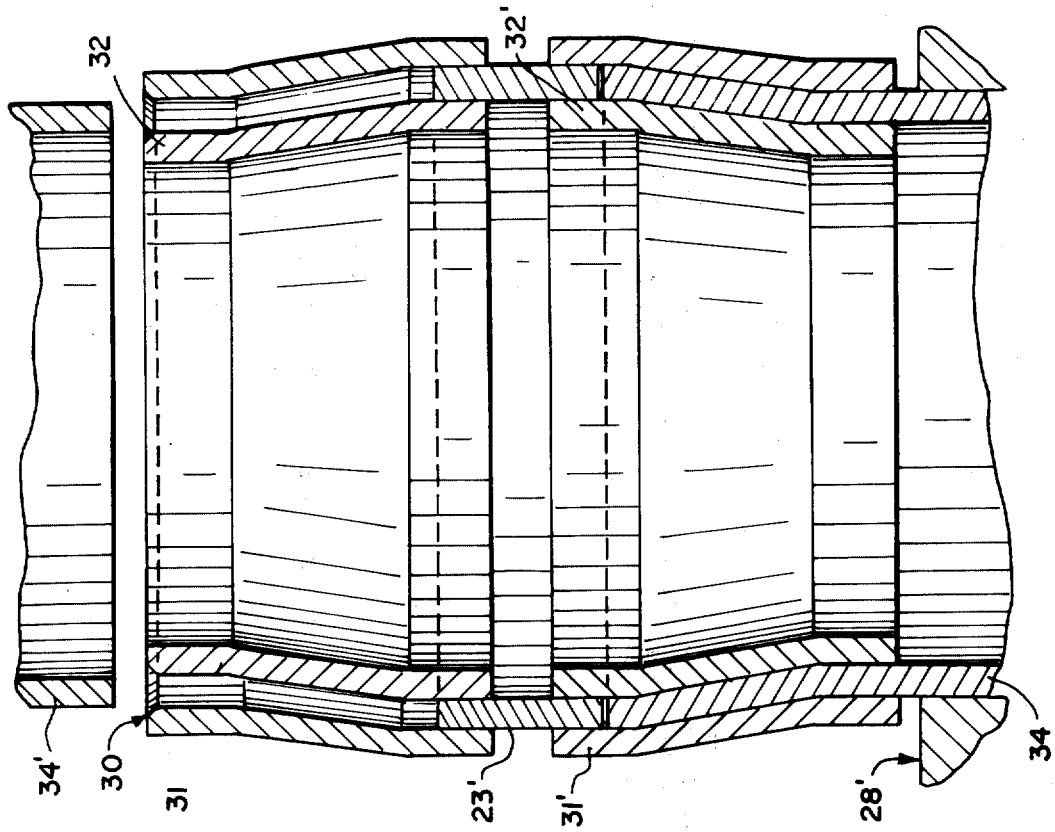
FIG. 2 is a vertical cross-sectional view of another embodiment of double sleeve coupler, shown in position for connecting two superposed sections of pipe pile, one of which is driven home and the other before entering the coupler.

FIG. 2 illustrated a coupler 20 which is generally similar to coupler 10 but which is superior in certain aspects hereinafter described, which make for greater ease of manufacture and which adapts the coupler for more effective use in coupling pipe pile together.

As shown, coupler 20 comprises two substantially circular sleeve elements 21 and 22 of varying diameters disposed coaxially and concentrically one within the other and separated by a central ring 23. The sleeve elements 21 and 22 are made of metal, such as steel, and of a uniform thickness somewhat greater and stronger than that of the wall of pipe sections 24 and 24' to be coupled by the coupler, so that the sleeve elements are sufficiently rigid and strong to cause expansion of the end of the pipe sections into expanded cylindrical form when driven into the annular spaces 26 and 27 between the two sleeve elements and on opposite sides of the central ring 23, respectively.

The sleeve elements are similar in form but sufficiently different in diameter that the inner sleeve element 21 may be inserted telescopically within the outer sleeve element 22 with the central ring 23 installed in the outer sleeve element. As will be seen in FIG. 2, the sleeve elements are of uniform wall thickness but are of varying diameter, the outer cylindrical ends being smaller in diameter than the cylindrical central or mid-length area, and integrally joined thereto by a tapering or conical portion. Accordingly, the annular spaces 26 and 27 between the sleeve elements are of uniform thickness and slightly larger than the gauge thickness of the wall of the pipe sections 24 and 24'. As shown, the wall thickness of the sleeve elements corresponds closely to the spacing therebetween.

The central ring 23 is of uniform thickness corresponding to the thickness of the annular spaces 26 and 27 and is bonded, as by welding, to the sleeve elements 21 and 22. The degree of taper between the large and smaller diameter portions of the outer sleeve element 22 is such that the central ring 23 is first inserted through the end opening of the outer sleeve element 22 and then expanded to fit within the central large diameter portion of the outer sleeve element 22 and welded thereto. Subsequently, the outer sleeve element and ring 23 are slipped over the inner sleeve element 21 and then bonded together. Thus, the coupler 20 is more simply and readily assembled than the coupler 10.

It will be observed that the width of ring 23 is less than the length of the central larger diameter portion of the sleeve elements 21 and 22. Thus, the annular spaces 26 and 27 constitute sockets comprising an outer end portion of one diameter, an inner end portion larger in diameter than the outer end portion by an amount at least twice the spacing between the sleeves, and an intervening tapered portion connecting the two. The inner and outer cylindrical end portions of the spaces 26 and 27 are coaxial to each other and to the axis of the coupler 20 itself. The inner cylindrical end portions of spaces 26 and 27 are greater in length than the radial distance between the sleeves for a reason later made clear.

The advantage of this specific structure is that as the end of the pipe pile is driven into the annular spaces 26 and 27, the end of the pipe pile is first expanded outwardly by an amount approximately twice the spacing between the sleeve elements or in other words, the wall thickness of the pipe and pipe pile to a larger diameter and then maintained at the uniform larger diameter for a substantial length. Thus the impact forces on one pipe pile section, such as pipe pile section 24', are transmitted coaxially in a direct line from the expanded cylindrical end thereof to the central ring 23 and thence to the other pipe pile section 24. As shown in FIG. 2, the coupler 20 has been installed over the upright end of pipe pile section 24, which has already been driven into the ground at 28 and is awaiting entrance of the superposed pipe pile section 24' into the upper end of coupler 20. Coupler 20 is thus more suited to coupling pipe pile than is coupler 10, in which a portion of the driving forces exerted on one pipe section is diverted laterally and not fully and directly transmitted coaxially through the coupler to the other pipe section. Obviously, coupler 20 is also equally well adapted for use in coupling horizontally disposed pipe sections, as distinct from vertically disposed pipe pile. As a matter of fact, I have found that the form of coupler shown in FIG. 2, by reason of it causing the end of the pipe or pipe pile to be expanded by an amount equal to at least twice the amount of the spacing between the sleeves into a cylindrical form of larger diameter after expansion thereto, produces a joint which is tighter and stronger under tension forces than when simply flared at the end as in FIG. 1.

Figure 3:
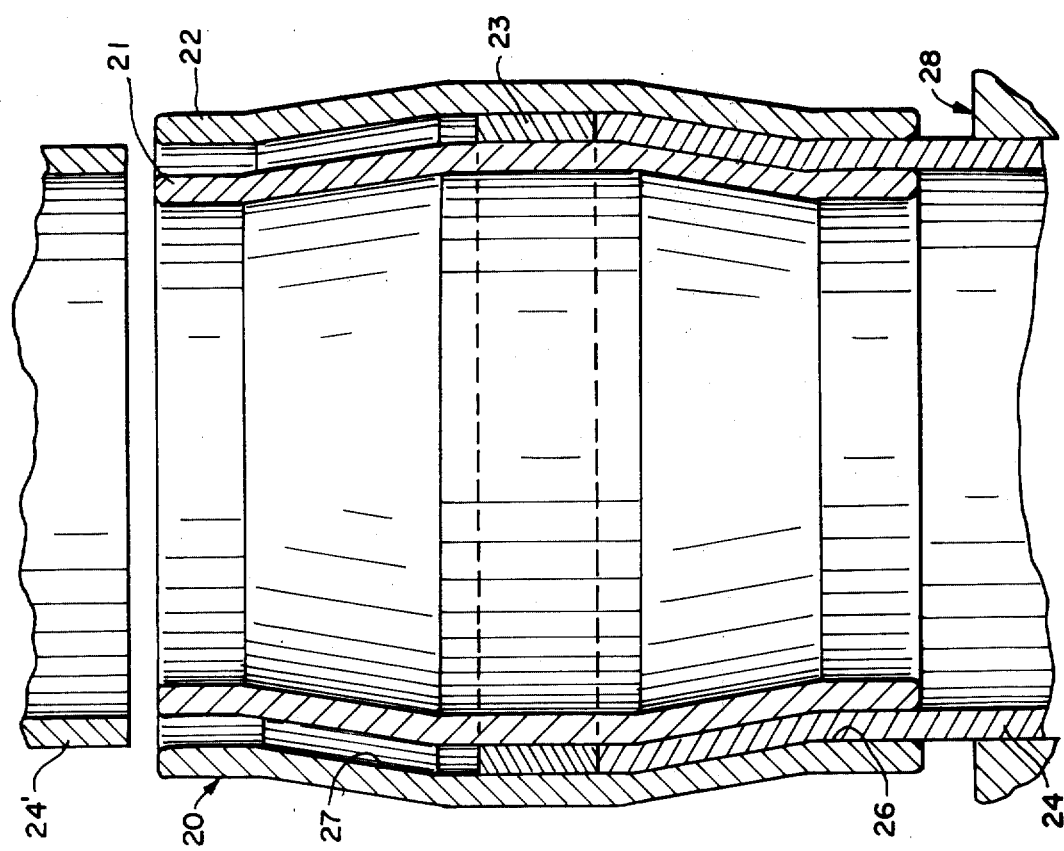
FIG. 3 is a verticl cross-sectional view of a variation of the double sleeve coupler shown in FIG. 2.

FIG. 3 shows a coupler 30 which is a variation of the coupler 20. As shown, coupler 30 differs from coupler 20 in that the outer and inner sleeve elements are made in two shorter longitudinally spaced parts 31, 31' and 32, 32' respectively, the inner ends of the sleeve parts being bonded, as by welding to a central ring 23'. The outer sleeve parts 31 and 31' are identical in configuration and are simply reversely but coaxially disposed in longitudinally spaced relation. Similarly, the inner sleeve parts 32 and 32' are identical in configuration and reversely and coaxially disposed in longitudinally spaced relation.

As is evident in FIG. 3, the sleeve parts are individually formed such that the end portions are of uniform diameter with one being of larger diameter than the other, and the two end portions being integrally joined by an intervening tapered portion.

In the matter of fabrication and assembly, coupler 30 has advantages over both couplers 10 and 20. Thus, it is not necessary to expand ring 23', as is the case with ring 23 of coupler 20, for the ring 23' is made to appropriate size orginally. Moreover, sleeve parts 31 and 32 may be bonded at one end to one side of the ring 23' and then the sleeve parts 31' and 32' may be bonded to the opposite side of the ring. As shown in FIG. 3, coupler 30 is installed on the end of a pipe pile section 34 already driven into the ground at 28', and a superposed pipe pile section 34' is poised above the coupler prior to being driven into the coupler.

Referring to FIG. 4, there is illustratively shown a mobile ram or hammer device 40 for installation of any of the forms of couplers 10, 20 and 30, coupler 10 being shown merely as an example.

Device 40 comprises a mobile platform 41 supported on two pairs of axle-connected wheels 42 and an auxiliary support ring 43 having a pair of axle-connected wheels 44. The auxiliary support ring 43 is attached to the platform 41 by a plurality of tension rods 45 circumferentially arranged and removably and adjustably secured to the ring 43 and to the annular flange 46 of a cylindrical cradle 47 attached to the platform 41.

At the end of the cylindrical cradle 47 opposite flange 47 is an open-ended cylinder 48 in which a piston-like ram 49 slidably operates. Also mounted on the platform 41 is a double-acting air cylinder 50, the piston 51 of which is connected to the ram 49 by a rod 52. Ports 53 and 54 are provided by which to admit and exhaust air under pressure from opposite sides of the piston 51.

The cradle 47 carries a plurality of angularly and adjustably spaced rollers 55 by which to support one end of a pipe section 56 coaxially within the cradle 47. In order to prevent upsetting the end of the pipe 56 due to blows of the ram 49 thereon, an intervening impact head 57 having an annular groove 58 in one face is provided, in which the end of pipe 56 is inserted.

The auxiliary support ring 43 carries a plurality of circularly arranged clamps or jaws 59 to grip a second section of pipe 56' on the end of which the coupler, such as coupler 10, has been placed.

In operation, the outer end of the pipe section 56 is inserted into the open end of the coupler 10, following which the tension rods 45 are suitably adjusted in length and tightened in position by nuts so as to hold the pipe sections and coupler in assembled relation. Having first made sure that the impact head 57 is secured properly in place over the inner end of the pipe section 56, the ram 49 may now be operated reciprocatively to deliver hammer blows to the impact head 57. The impact of the blows of the ram 49 on the head 57 drives the pipe sections into the annular spaces at opposite ends of the coupler until driven fully home.

It will be understood that ram 49 is reciprocated by the air pressure operated cylinder 50, operation of which is controlled by valves (not shown) in conduits connected respectively to the ports 53 and 54.

Referring to FIGS. 5 to 12, variants of the form of coupler shown in FIGS. 2 and 3 will now be described.

In FIG. 5, the form of coupler 60 shown comprises an inner circular sleeve 61 and an outer circular sleeve 62. The inner sleeve 61 has a smooth bore 63 of uniform diameter and an outer surface formed or machined with end sections 64 and 64' of the same diameters, a central section 65 of larger diameter than the end sections, and conical or tapered sections 66 and 66' intervening between and joining the end sections 64 and 64' to the central section 65. The outer surface of outer sleeve 62 is of uniform diameter, whereas the inner surface or bore thereof has sections of different diameter conformable to and paralleling the outer surface of the inner sleeve 61, the spacing between the two sleeves being uniform along the length of the sleeves. The sleeves are held in spaced relation by a central projection 66, extending inwardly from the central section of the outer sleeve. It will be seen that the bore 67 in the projection 66 conforms closely to the diameter of the central section 65 of the outer surface of the inner sleeve and seats firmly thereon. The two sleeves may be suitably bonded together as by spot welding via the projection 66 or by a plurality of machine screws (not shown) engaging registering topped holes in the two sleeves.

It will be seen that the annular spaces between the two sleeves 61 and 62 of coupler 60 provide sockets into which pipe or pipe pile may be driven. As in the coupler 20 of FIG. 2, the pipe or pipe pile driven into the sockets of coupler 60, are caused to expand over the conical or tapering sections 66 and 66' of sleeve 61 and then straighten out again into cylindrical form of uniform diameter as the end of the pipe or pipe pile enters the inner end section of the sockets. As with coupler 20, coupler 60 joins the pipe or pipe pile to the coupler so as to provide tremendous strength under tension by reason of the length of the inner end section of the annular socket.

Referring to FIGS. 6–9, the various forms of coupler respectively shown therein are designated generally by the reference numerals 71, 72, 73 and 74. These couplers are similar in that they all comprise a central collar 75, to one side of which is coaxially secured, as by welding, a first pair of concentric radially spaced sleeves, and to the other side of which is coaxially secured, as by welding, a second pair of concentric radially spaced sleeves. The one set of concentric sleeves of coupler 71 is identified by reference numerals 76 and 77 and the other set of concentric sleeves is identified by the reference numerals 78 and 79. Without detailed description, the annular space between the sleeves 76 and 77 of FIG. 6 will be referred to as socket 80 and the annular space between the sleeves 78 and 79 will be referred to as socket 81. It will be seen that both sockets 80 and 81 are of such configuration as to expand the pipe or pipe pile driven thereinto to a larger diameter as with previously described forms of couplers. It will be apparent that sockets 80 and 81 will accommodate pipe or pipe pile of different diameters, thus effecting a coupling of pipe or pipe pile of different diameters.

The several sets of concentric sleeves in couplers 72, 73 and 74 will be identified by reference numerals corresponding to those in FIG. 6, except with the suffix a, b, and c, respectively. The annular sockets in the couplers of FIGS. 7, 8 and 9 will similarly be identified by the same reference numeral as in FIG. 6 except with the suffix a, b and c.

It will be noted that the configuration of the upper and lower sets of concentric sleeves are not identical so that variations in the configuration of the annular sockets occur. It will be noted that sockets, 80a, 80b and 80c are different from socket 80 in that the inner end of these sockets is of smaller diameter than the outer end of the socket, whereas the inner end of socket 80 is of larger diameter than the outer end. Thus, it will be understood that as the pipe or pipe pile is driven into sockets 80a, 80b and 80c the pipe or pipe pile is circumferentially contracted as distinguished from the circumferential expansion, caused by socket 80.

It will be noted also that socket 80a is similar to socket 80 in that it terminates short of the collar 75, whereas sockets 80b and 80c extend fully to the collar 75.

The lower sets of sleeves for couplers 71 and 72 are identical, the inner end of sockets 81 and 81a both terminating short of the collar. The lower sets of sleeves for couplers 73 and 74 are identical but differ from those of couplers 71 and 72 in that the sockets 81b and 81c terminate at the collar 75. In all sockets 81, 81a, 81b and 81c the pipe or pipe pile is caused to expand as it is driven into the socket.

Referring to FIG. 10, another form of coupler 90 is shown, in which two sets of concentrically disposed sleeves are secured in coaxial relation as by welding. The upper set of concentric sleeves 91 and 92 form a socket 93 therebetween similar in configuration to socket 80a of coupler 72. The lower set of concentric sleeves 94 and 95 form a socket 96 therebetween which is similar in configuration to that of socket 81b of coupler 73. It will be seen that the inner extremities of sockets 93 and 96 are of the same diameter and in coaxial alignment. Thus the force driving a pipe pile into the upper set of sleeves of coupler 90 is transmitted to the shoulder 97 on the inner sleeve 92 and directly in an axial line to the pipe pile in socket 96.

Referring to FIG. 11, a coupler 100 is shown which is functionally and structurally similar to coupler 90 except that it consists of two concentrically disposed sleeves 101 and 102. The inner sleeve 101 has a central bore 103 which may be of uniform diameter or stepped as shown. The outer surface of sleeve 101 is formed, as by machining to provide the inner wall of two sockets 104 and 105 similar to sockets 93 and 96 of coupler 90. At the center of the outer surface of sleeve 101 is a projection 106 which serves to hold the two sleeves 101 and 102 in radially spaced relation. The two sleeves may be bonded, as by spot welding through the projection 106 or by screws engaging topped aligned holes including holes in the projection 106. The outer sleeve may have a smooth outer surface of uniform diameter or a stepped contour as shown. The inner bore of the outer sleeve 102 has a configuration conformable to that of the outer surface of the inner sleeve 101 thereby providing the outer wall of the two sockets 104 and 105.

Referring to FIG. 12, another form of coupler 110 is shown consisting of two concentric sleeves 111 and 112 of different diameters and held in uniformly radially spaced relation by a flat annular member or ring 113 interposed centrally therebetween. It will be noted that the contour of the outer surface 114 of the inner sleeve 111 and the contour of the bore 115 of the outer sleeve are parallel so as to form sockets 116 and 117 therebetween similar in appearance to sockets 104 and 105 of coupler 100. The sleeves 111 and 112 and the ring 113 are suitably secured together after assembly, as by spot welding or by screws engaging tapped aligned holes therein.

It will be observed that in both couplers 100 and 110, the sleeves can be assembled only by telescoping the larger diameter end of the outer sleeve over the smaller diameter end of the inner sleeve.

Referring to FIGS. 13 to 18, various forms of pipe pile sections, pre-cast concrete pile sections and composite pipe pile and cast concrete sections are shown in which various ways are depicted of embodying couplers of the type hereinbefore described.

In FIG. 13, there are shown a lower precast sectional pile secton 120 consisting of an outer thin wall pipe shell 121, a circular boot plate 122 secured, as by welding, to the lower end of the shell 121 within the bore, and a circular disc and pipe member 123 secured, as by welding to the upper end of the shell 121 within the bore thereof. Concrete 124 is deposited in the shell and allowed to set and harden before the member 123 is attached.

Also shown in FIG. 13, is an upper precast sectional pile section 125 comprising an outer thin-wall pipe shell 126, having secured in the bore thereof at its lower end a coupler socket unit 127. Socket unit 127 is similar to that of FIG. 6, comprising a collar 128 and two concentric sleeves 129 and 130 secured coaxially to one side of collar 128, and forming an annular socket 131 therebetween. The central bore 132 of the inner sleeve 130 is closed at its lower end by a snugly fit circular plate or disc 133, secured as by welding to the sleeve 130. The pipe shell 125 is filled with concrete 134 and after the concrete has hardened, a disc and pipe member 135 is secured as by welding in the top end of the bore of the shell.

In use, the lower pile section 120 is first driven into the ground to a depth leaving the disc and pipe member 123 exposed above ground level. The upper pile section 125 is then superposed in vertical alignment with the lower pile section so that it may be coupled to the lower section by insertion of the pipe section of member 123 into the socket 131, after which the upper pile section 125 may be driven downwardly as by a mandrel into coupled relation with the lower pile section. Once the pile sections are coupled as described, further pounding with the mandrel will drive both upper and lower pile sections concurrently into the ground. After the pile section 125 is driven sufficiently into the ground a third pile secton, corresponding to pile section 125 may be similarly coupled to the top end of the pile secton 125 and all pile sections driven further into the ground.

FIG. 14 shows a set of pile sections of pre-cast concrete, consisting of a lower pile section 140 and an upper pile section 141, similar to those of FIG. 13 except they are cast in molds and do not have the thin-wall pipe shells 121 and 126. For convenience, the parts of the pile sections in FIG. 14 corresponding to those of the pile sections of FIG. 13 are designated by the same reference numerals with the prime (') suffix without further description. In addition, the boot plate 122' and disc and pipe member 123' of the lower pile section 140 may be joined by reinforcing rods or dowels 42 welded thereto and reinforcing the concrete poured around them in a mold. Similarly, the collar 128' of socket unit 127' may be joined to disc and pipe member 135' through reinforcing rods or dowels 143 welded thereto and around which concrete is poured while in a mold.

FIG. 15 shows a set of pile sections, the lower one of which is an open-ended pipe pile section 145, and the upper one of which 146 is a composite pre-cast type of pile section similar to pile section 125 of FIG. 13.

In view of the prior full description of the pile section 125 of FIG. 13, no further description of pile section 146 is deemed necessary.

It will be apparent that the upper pile section 146 is coupled to the pipe pile section 145 by aligning the annular socket of the socket unit with the upper end of the pipe pile 145 and then driving the upper pile section downwardly.

FIG. 16 shows a set of pile sections, the lower one 147 of which is an open-ended pipe pile and the upper one 149 of which is a thin-walled pipe pile section as distinguished from the pile section 146 of FIG. 15. Pile section 149 has a circular disc 150 secured, as by spot welding, within the bore of the pile section 149, to which the socket unit 151 has been previously attached. In this case the central bore of the inner sleeve of the socket unit 151 is open at the bottom, no closure disc, such as the disc 133 of FIG. 13, being necessary.

In use, the upper pile section 149 may be coupled to the pipe pile section 147 and then further driving of both upper and lower pile sections accomplished by means of a mandrel 152 of conventional pile driving equipment. After the upper pile section 149 is driven fully into the ground as desired, the mandrel 152 is removed and the upper pile section then filled with concrete.

FIG. 17 shows a set of pipe pile sections 147' and 149' similar to pile sections 147 and 149 of FIG. 16. In this case, however, socket unit 127", similar to socket unit 127 of FIG. 13, is employed, wherein a pair of concentric sleeves are secured coaxially to one side of a collar 128". Also the bore of the internal sleeve of the socket unit is left open and a disc similar to disc 133 of FIG. 13 is omitted. In this case, a pipe pile section 153 may be employed to drive the upper pile section, instead of the mandrel 152 being so used. Upon completion of the pile driving operation, the both pile sections 147' and 149' may be filled with aggregate or concrete via the upper pile section 149', since the interiors of the pile sections are open to each other through the internal bore of the socket unit 127".

FIG. 18 is a fragmental sectional view, showing a variation of the upper pipe pile section of FIG. 17, which enables a smaller diameter pile section to be employed. In FIG. 18, the shell of a pipe pile 155 smaller in diameter than that of pipe pile 149' of FIG. 17, is employed. A socket unit 156, of correspondingly smaller diameter to socket unit 127", is secured within the shell of the pipe pile 155. Moreover, socket unit 156 contains an annular socket 157 differing from that of socket unit 127" in that it causes circumferential contraction of the pipe pile as it is driven into the socket unit 156.

It will be seen that in this particular embodiment of coupler and pipe pile, it is thus possible to employ an upper pile section more closely conforming to the diameter of the lower pile section than is the case in the combination of pile sections shown in FIG. 17.

I claim:

1. A metal coupler for joining two sections of coaxially juxtaposed plain end metal pipe and pipe pile, comprising an inner sleeve element of circular form, an outer sleeve element of circular form concentrically surrounding said inner sleeve element, and a centrally disposed annular member which connects and supports said sleeve elements in uniformly spaced radial relation along the length thereof, the space between said sleeve elements providing annular sockets on opposite sides of said annular member into which the ends of pipe and pipe pile will fit snugly, each of said annular sockets having an outer section of substantial length and one average diameter and an inner terminal section of a different average diameter adjacent said annular member and an intervening conical section, the inner terminal section of each of said sockets having a length such that a line through the intersection of the conical section with the inner terminal section at the inner diameter thereof and the outer diameter of the inner terminal section at the inner terminus thereof, when projected, forms an angle with the longitudinal axis of the coupler less than 45°.

2. A metal coupler according to claim 1, wherein the outer sleeve element will abut the conically deformed section of the pipe after the pipe has been driven into said annular sockets and thereby restrain separation of the pipe from the coupler under tension.

3. A metal coupler according to claim 1, wherein the outer section of said annular sockets is of lesser average diameter than the inner section thereof.

4. A metal coupler for joining two sections of coaxially juxtaposed plain end metal pipe and pipe pile, comprising an inner sleeve element, an outer sleeve element concentrically surrounding said inner sleeve element, and a centrally disposed annular member which connects and support said sleeve elements in uniformly spaced radial relation, the space between said sleeve elements providing annular sockets of uniform thickness throughout the length thereof on opposite sides of said annular member into which the ends of pipe or pipe pile will fit snugly, said annular sockets having a tapered portion increasing in diameter toward the annular member whereby to cause expansion of the end of the pipe to be driven therein by an amount equal substantially to twice the wall thickness of said pipe and pipe pile and having an inner terminal section of uniform diameter and a length such that a line through the intersection of the tapered portion with the terminal section at the inner diameter thereof and the intersection of the outer diameter of the terminal section with the annular member, when projected, forms an angle with the longitudinal axis of the coupler less than 45°.

5. A metal coupler for joining two sections of coaxially juxtaposed plain end metal pipe and pipe pile, comprising an inner sleeve of circular form, an outer sleeve of circular form concentrically surrounding said inner sleeve, and an annular support member interposed centrally between said inner and outer sleeves, said support member being integrally bonded to said sleeves and supporting them in uniformly spaced radial relation along the lengths thereof, the space between the said sleeves forming annular sockets on opposite sides of said support member into which the wall of the respective pipe sections will snugly fit, each socket comprising an annular section of substantial length and one average diameter at the outer end thereof and an annular section of a larger average diameter at the inner end connected by a conical section whereby to cause expansion of pipe or pipe pile driven into the outer end of the sockets through the conical section of the sockets to the larger diameter inner end section thereof and into abutting contact with said support member, in which position of the pipe or pipe pile the metal-to-metal contact of the pipe with the inner sleeve provides a leakproof seal therewith, the contact of the pipe with the outer sleeve serving to resist axial pull on the pipes, and the driving energy imparted to one section of pipe or pipe pile being transmitted solely on an axial line to the other section of pipe or pipe pile in contact with the annular support member, the annular section of larger diameter at the inner end of the sockets being of a length such that a line through the intersection of the conical section therewith at the inner diameter and the inner end of the inner end section at the outer diameter, when projected, forms an angle with the longitudinal axis of the coupler less than 45°.

6. A metal coupler for joining two sections of coaxially juxtaposed plain end metal pipe and pipe pile according to claim 5, wherein the inner end section of each of the annular sockets has an average diameter larger than that of the outer end section by an amount substantially twice the wall thickness of said pipe or pipe pile.

7. A metal coupler for joining two sections of coaxially juxtaposed plain end metal pipe and pipe pile according to claim 5, wherein each of said inner and outer sleeves comprises two similar reversely oriented sections, and said annular support member integrally joins said two similar sections of the inner and outer pairs of sleeves.

8. A metal coupler for joining two sections of coaxially juxtaposed plain end metal pipe and pipe pile according to claim 5, wherein said annular support member comprises a flat ring having a thickness substantially equivalent to the radial thickness of said annular sockets whereby with said ring installed within the central portion of said outer sleeve, said inner sleeve may be telescopically inserted endwise within said outer sleeve and said flat ring into a concentric relation of the two sleeves.

9. A metal coupler for joining two sections of coaxially juxtaposed plain end metal pipe and pipe pile, comprising two sleeve elements of uniform wall thickness but different diameters disposed coaxially in concentric spaced relation; each of said sleeve elements comprising opposite end portions of the same diameter, a central portion the outer and inner diameters of which are larger than the outer and inner diameters of the end portions by at least twice the spacing between the sleeves and a tapering portion joining each of the end portions and said central portion, and an annular member of uniform thickness interposed in bonded relation between the central portions of said sleeves and supporting said sleeves in uniformly concentrically spaced relation along the length thereof on opposite sides of said annular member to provide sockets into which pipe and pipe pile may be driven, the innermost end portion of said sockets formed between the central portions of said sleeve elements being of a length such that line through the outer and inner diameters of the innermost end portion at opposite extremities thereof, when projected, forms an angle with the longitudinal axis of the coupler less than 45°.

10. A metal coupler according to claim 9, wherein said annular member is shorter in width than the length of said central portion of said sleeves thereby providing sockets, the inner end of which is effective when pipe and pipe pile is driven thereinto to cause expansion thereof to a uniform diameter cylindrical form larger than the original diameter thereof by an amount at least twice the spacing between the said sleeves, and having a length greater than the spacing between the sleeves.

11. A metal coupler for joining two sections of coaxially juxtaposed plain end metal pipe and pipe pile, comprising a first pair of identical sleeves, a second pair of identical sleeves of larger diameter than said first pair, each of said sleeves having opposite end portions of different diameters joined by an intervening tapering portion, said respective pairs of sleeves being disposed in reversed positions with the larger diameter ends in coaxial longitudinally spaced relation, and an annular member to which the larger diameter ends of said sleeves are bonded and which supports said first and second pairs of sleeves in uniformly spaced relation to provide annular sockets at opposite ends of the coupler into which metal pipe may be driven, the innermost larger diameter ends of said sockets being cylindrical in form and of a length such that the depth of penetration of the metal pipe therein exceeds a distance equal to the spacing between said sleeves 12. A metal coupler according to claim 1, wherein the opposite end portions of each of said sleeves differ in diameter by at least twice the spacing between said sleeves.

13. A metal coupler for joining two sections of coaxially juxaposed plain end metal pipe, comprising a first pair of identical sleeves of uniform thickness, each of said first pair of sleeves having one end portion of one diameter, an opposite end portion of a larger diameter, and an intervening tapering portion joining said end portions, said first pair of sleeves being disposed coaxially in allochirally related positions with the larger diameter ends in opposed spaced relation, a second pair of identical sleeves of uniform thickness and larger in diameter than said first pair of sleeves, each of said second pair of sleeves having one end portion of one diameter, an opposite end portion of a larger diameter, and an intervening tapering portion joining said end portions, said second pair of sleeves being disposed coaxially in allochirally related positions with the larger diameter ends in opposed spaced relation, and an annular member of uniform thickness to which the larger diameter ends of said first and second pair of sleeves are bonded holding said pairs of sleeves in concentrically spaced relation and thereby providing annular sockets into which metal pipe may be driven, the innermost larger diameter end of said sockets being cylindrical in form and of a length for penetration of the metal pipe therein a distance exceeding the concentric spacing between said pairs of sleeves.

14. A metal coupler for joining two sections of plain end metal pipe, pipe pile and the like, comprising two sleeves of different diameters positioned in concentric uniformly radially spaced relation, one of said sleeves having a projection thereon substantially midway between the ends thereof for holding the sleeves in spaced relation, the outer surface of the inner sleeve and the inner surface of the outer sleeve paralleling each other to provide an annular socket opening at opposite ends of the coupler, the outer section and inner section of said sockets being of different diameters and being connected by a conical section, the length of the outer and inner sections of said sockets being greater than the radial spacing between said sleeves.

15. A metal coupler for joining two sections of plain end metal pipe, pipe pile and the like, comprising a flat annular member having opposite faces, a pair of sleeves arranged in radially spaced concentric relation and secured coaxially to one face of said member, a pair of sleeves arranged in radially spaced concentric relation and secured coaxially to the opposite face of said member, each of said pairs of sleeves having cooperating external and internal configurations so as to provide annular sockets opening exteriorly at opposite ends of said coupler into which the metal pipe may be driven, said annular sockets having an outer cylindrical section, an inner cylindrical section of different diameter than the outer section, and a conical section intervening between and connecting said outer and nner sections, said inner and outer cylindrical sections being longer than the radial spacing between said pairs of sleeves.

16. A metal coupler accoding to claim 1, wherein the annular socket opening at one end of the coupler is of a configurationto circumferentially expand a pipe driven thereinto and the annular socket opening at the opposite end of the coupler is of a configuration to circumferentially contract a pipe driven thereinto.

17. A metal coupler for joining two sections of plain end pipe and pipe pile comprising two sleeve members of different diameters respectively and means midway for the ends of said sleeve members holding them in uniformly radially spaced concentric relation along the lengths thereof, the outer surface of the inner one of said sleeves having sections at opposite ends of different diameters, an intermediate section of a diameter corresponding to the average of the diameters of the end sections, and conical sections between and joining each end section to the intermediate section, while the inner surface of the outer one of said sleeves is a bore the respective sections of which along the length thereof conform to and parallel corresponding sections along the length of the inner sleeve.

18. The combination with two sections of pipe, pipe pile and pre-cast concrete pile of a coupler for joining said two sections, said coupler comprising two cooperating members, the first of which is a socket member secured to one of said two sections, said socket member comprising a first annular member in which is formed an annular socket of uniform thickness throughout its length and opening at the outer end of said annular member, the outer and inner sections of said annular socket being of different diameters and joined by an intervening conical section, the inner section of said annular socket having a length exceeding the thickness of said socket, and the second of which comprises an annular member of uniform wall thickness and corresponding in diameter to the outer opening of said annular socket, which annular member is coaxially secured to the other of said two sections, said annular member having a length corresponding to that of said annular socket and being deformed conformably to the configuration of said annular socket as the two sections are driven together.

19. The combination with a thin walled pipe pile and a thick walled pipe pile of a metal coupler for joining said thin walled pipe pile to said thick walled pipe pile, said coupler comprising an annular member secured within the lower end of the bore of the thin walled pipe pile, said annular member having therein an annular socket of uniform thickness opening at the outer end thereof and extending longitudinally into said annular member, said annular socket having outer and inner sections of different diameters joined by a conical section, the outer section of said annular socket conforming in diameter and thickness to that of the thick walled pipe pile for receiving said thick walled pipe snugly therein, and the inner section of said annular socket conforming in thickness to that of the thick walled pipe and having a length greater than the thickness thereof, the end of the thick walled pipe pile being deformed conformably to the configuration of said annular socket member as the thick walled pipe pile is driven into said annular socket.

20. A pre-cast concrete pile having at one end a disc and a pipe section of uniform thickness coaxially secured thereto, and having at the other end a socket member of annular configuration having therein an annular socket coaxial to said pipe section in which to receive another pipe section or pile, and annular socket having outer and inner sections of different diameters joined by a conical section, the inner section having a length exceeding the thickness of said pipe section and the total depth of said socket exceeding the length of the pipe section, whereby another pipe section or pile is deformed conformably to that of said annular socket when driven therein.

21. A pre-cast concrete pile according to claim 20, wherein said disc and said socket member are joined by reinforcing rods embedded in the concrete.

22. A pre-cast concrete pile according to claim 20, wherein said pile comprises an outer shell which serves as a mold for the concrete, said disc being secured within the bore of said shell at one end and said annular socket member being secured in the bore of said shell at the other end.

* * * * *